(12) United States Patent
Ito

(10) Patent No.: US 8,496,186 B2
(45) Date of Patent: Jul. 30, 2013

(54) BARCODE LABEL AND METHOD OF USING THE SAME

(75) Inventor: Kiyoshi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 13/011,578

(22) Filed: Jan. 21, 2011

(65) Prior Publication Data
US 2011/0180616 A1 Jul. 28, 2011

(30) Foreign Application Priority Data

Jan. 22, 2010 (JP) ................................ 2010-011770

(51) Int. Cl.
*G06K 19/06* (2006.01)

(52) U.S. Cl.
USPC ....... 235/494; 235/487; 235/454; 235/462.01

(58) Field of Classification Search
None
See application file for complete search history.

(56) References Cited

U.S. PATENT DOCUMENTS

| | | | | |
|---|---|---|---|---|
| 3,808,718 A | * | 5/1974 | Christiansen | 40/6 |
| 5,366,249 A | * | 11/1994 | Diemert | 283/80 |
| 5,981,013 A | * | 11/1999 | Russ et al. | 428/43 |
| 6,361,077 B1 | | 3/2002 | Petkovsek | |
| 2008/0290144 A1 | * | 11/2008 | Makofsky | 229/68.1 |
| 2009/0022926 A1 | * | 1/2009 | Dangami | 428/42.2 |

FOREIGN PATENT DOCUMENTS

| | | |
|---|---|---|
| EP | 0568843 A | 11/1993 |
| JP | 5-081460 A | 4/1993 |
| JP | 9-234981 A | 9/1997 |
| JP | 11-282988 A | 10/1999 |

OTHER PUBLICATIONS

European Search Report, May 20, 2011.

* cited by examiner

*Primary Examiner* — Thien M Le
*Assistant Examiner* — Sonji Johnson
(74) *Attorney, Agent, or Firm* — Nutter McClennen & Fish LLP; John J. Penny, V.

(57) ABSTRACT

A shipping label includes a shipping label and an advertising label, and a tear-off tab is formed in the back liner sheet by a score line. After removing the tear-off tab and forming an exposed adhesive layer portion, the label part where the second barcode is printed is folded to the back side of the label to form a back-folded portion, which is held to the back side of the label by the exposed adhesive layer portion. The liner sheet portion contiguous to the tear-off tab is then removed, and the label is attached to the product. Because the second barcode is hidden on the back, only the first barcodes containing tracking information can be read, while the second barcode can be read as needed by unfolding the back-folded portion to the front.

17 Claims, 4 Drawing Sheets

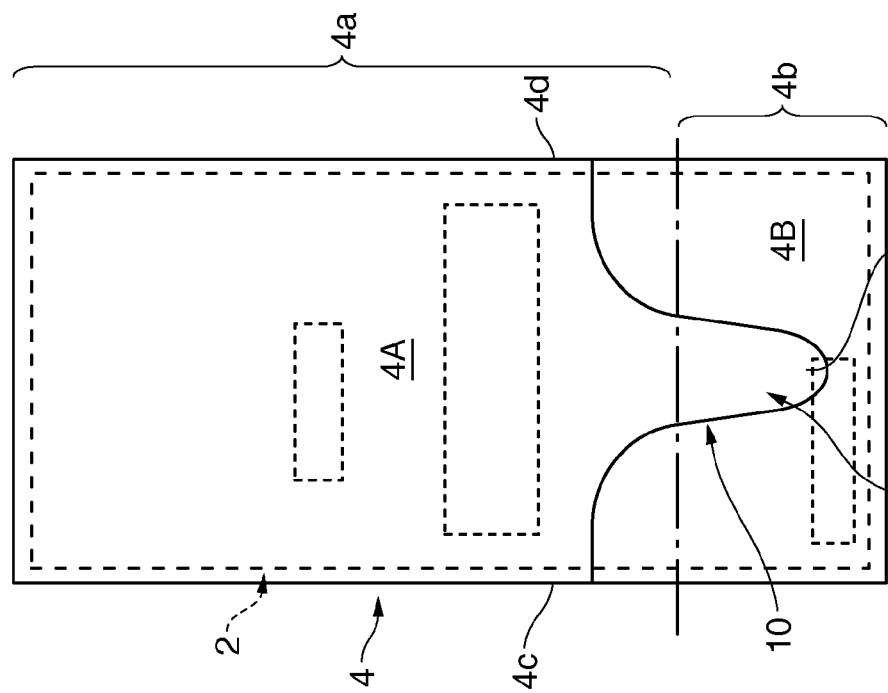
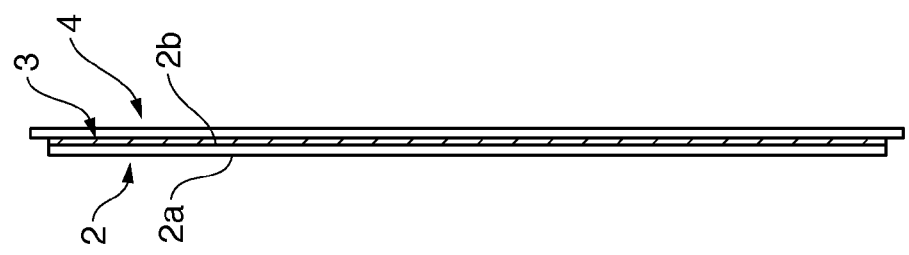
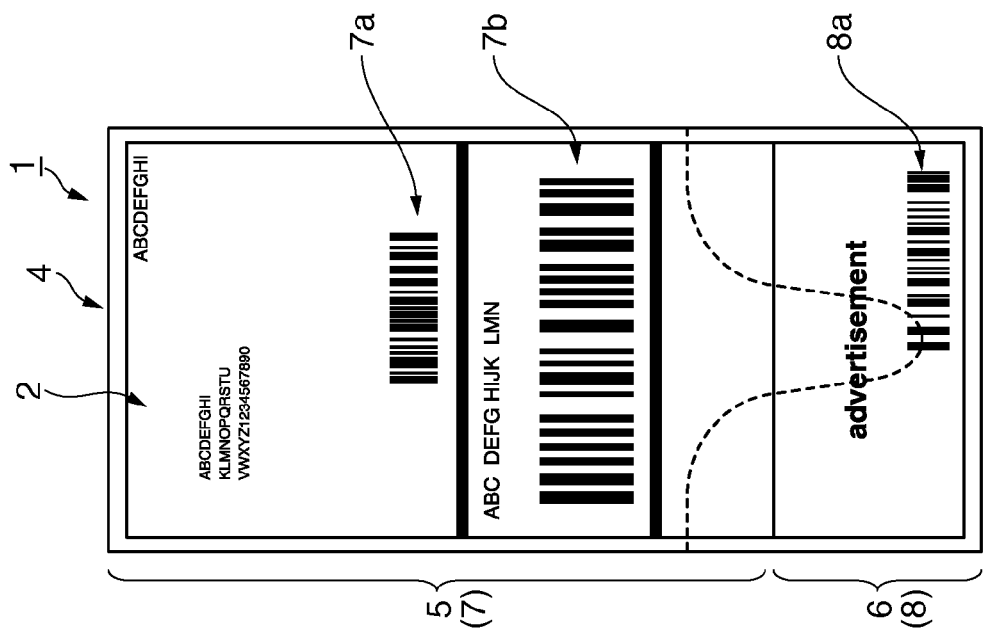

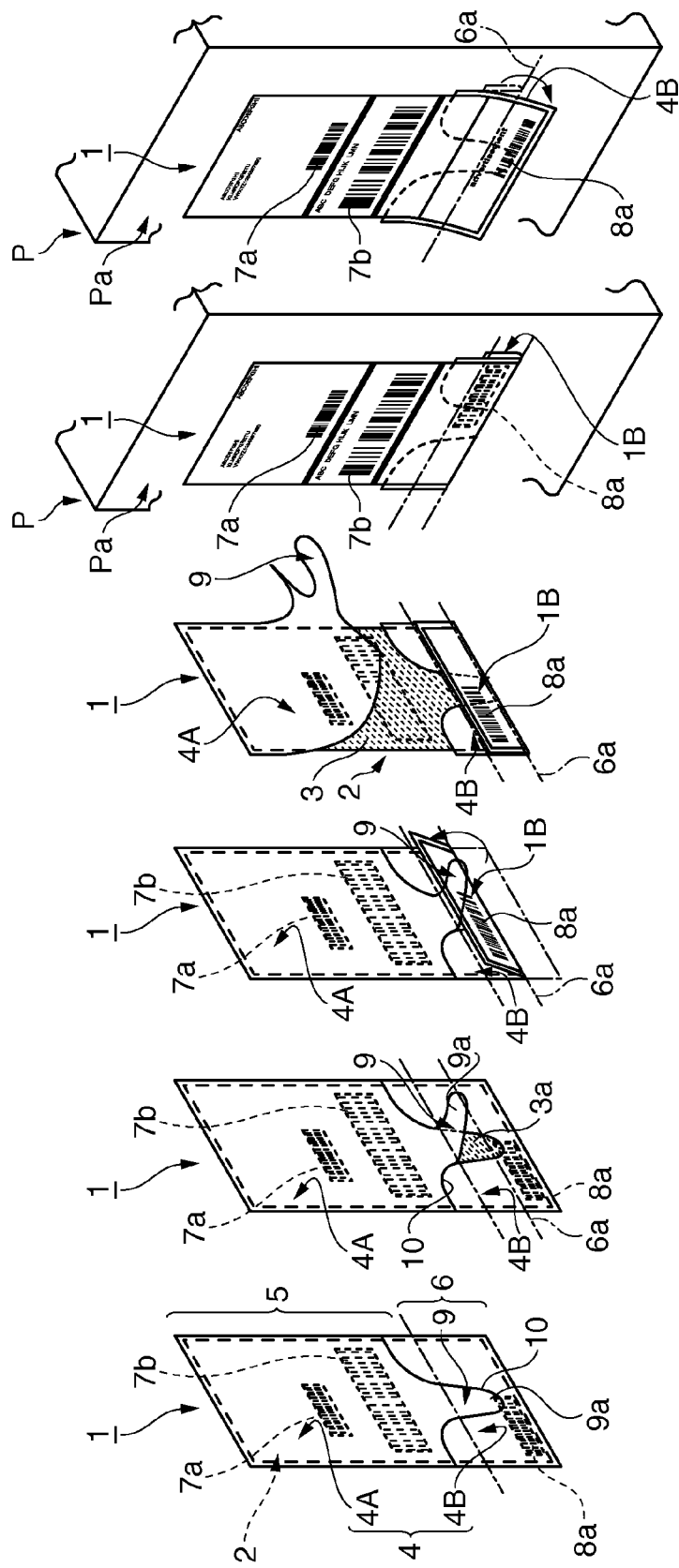

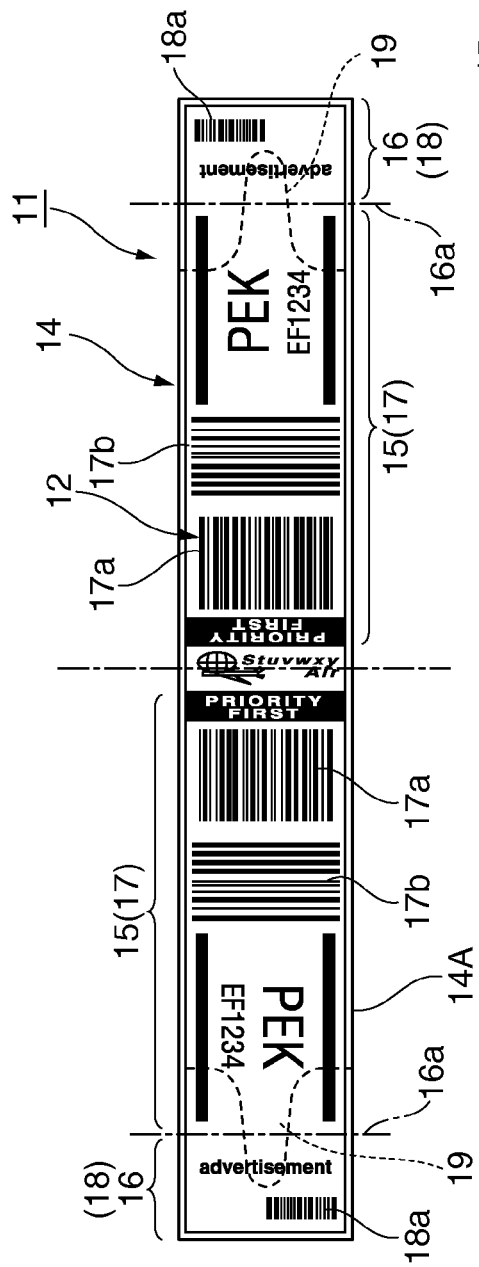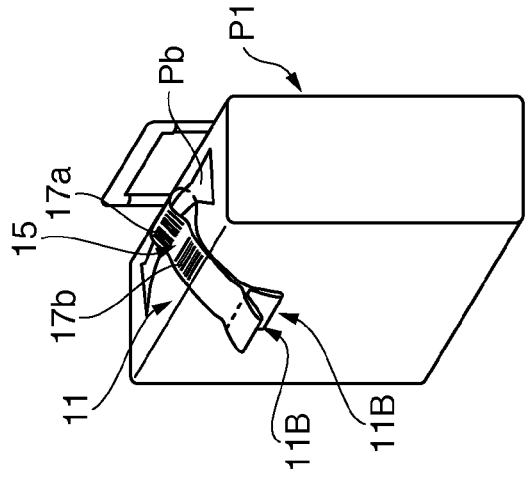
FIG. 3A
FIG. 3B

BARCODE LABEL AND METHOD OF USING THE SAME

BACKGROUND

1. Technical Field

The present invention relates to barcode labels on which plural barcodes are printed for use as luggage tags for airline passenger luggage or product shipping labels, for example. More particularly, the invention relates to barcode labels that can be used applied to a labelled object so that an existing barcode can be read by existing barcode readers without being affected by a newly added barcode, and the newly added barcode can be read as needed. The invention also relates to a method of using the barcode labels.

2. Related Art

Management systems that use barcodes to manage product distribution and shipping, for example, are common. Such barcode management systems affix a label (a shipping label) on which a barcode is printed on the product or other object to be tracked by means of the barcode, read the barcode from the label affixed to the product at each stage of the shipping process, and manage the information captured from the barcode on a computer terminal.

Coupons, product advertisements, and similar content can also be added with a barcode to the label so that additional services can be offered to customers based on the information carried in the added barcode. However, if the barcode added to provide additional services is also read when the product shipping bode is read, the shipping information carried in the shipping barcode may not be accurately read, resulting in problems with shipping management. To avoid such problems, a management system that uses a special barcode reader such as taught in Japanese Unexamined Patent Appl. Pub. JP-A-H05-081460 must be used.

However, in order to use a special barcode reader such as taught in JP-A-H05-081460, the management system that uses conventional barcodes must be modified, and such modifications incur additional costs.

SUMMARY

A barcode label and a method of using a barcode label according to the invention enable applying the barcode label to a labelled object so that an existing barcode can be correctly read without being affected by the newly added barcode and the newly added barcode can be read as necessary by the existing management system without modifying the management system.

A first aspect of the invention is a barcode label including a label sheet of a specific length, including a first label part on which first printed information including a first barcode is printed, and a second label part on which second printed information including a second barcode is printed; an adhesive layer formed on the back side of the label sheet; and a liner sheet. The liner sheet removably covers the adhesive layer, and includes a first liner sheet portion positioned on the back side of the first label part, a second liner sheet portion positioned on the back side of the second label part, and a tear-off portion that enables removing only a part of the liner sheet from the label sheet, is formed in at least one of the first liner sheet portion and second liner sheet portion. The tear-off portion is formed so that, when at least the portion of the second label part where the second barcode is printed is folded to the back side of the second label part and forms a back-folded portion, the tear-off portion is positioned to at least one of the back side of the back-folded portion, the back side of the second label part facing the back-folded portion, and the back of the first label part facing the back-folded portion.

A folding line may be printed on the label sheet at the position where it is folded to form the back-folded portion. However, to enable a simple and clean fold, an easy-to-fold part that defines where to fold is preferably formed. The easy-to-fold part may be a perforation that is formed in at least one of the label sheet and liner sheet. If the label sheet is precut at the folding position, the easy-to-fold part can be defined by the score in the label sheet, and the liner sheet can be easily and cleanly folded along the score line.

The barcode label of the invention can be applied to an object and used as described below. First, the tear-off portion is removed to form an exposed adhesive layer portion where part of the adhesive layer is exposed.

Next, the second label part is folded to the back side along a folding line that extends widthwise at a specific position, forming a back-folded portion that is affixed to the back side of the barcode label by the exposed adhesive layer portion. The second barcode can thus be hidden on the back side of the barcode label. Folding is even easier when an easy-to-fold part is provided.

The first liner sheet portion of the first label part is then removed, and the first label part is affixed to the target object. As a result, the first barcode printed in the first label part can be read using a barcode reader, and the second barcode will not be read because it is hidden on the back side. To read the second barcode in the second label part, the back-folded portion is peeled from the back side of the barcode label and unfolded to the front of the barcode label to expose the second barcode.

As a result, the first barcode can be read from the front of a barcode label affixed to a target object, and the second barcode hidden on the back side of the label will not be read by the barcode reader. Therefore, if a second barcode is added, first barcode read errors caused by the second barcode being read with the first barcode will not occur.

The adhesive layer on the back side of the back-folded portion where the second barcode is printed is covered by the second liner sheet portion, and is attached to the back side of the label by only this exposed adhesive layer portion. Therefore, if the back-folded portion is appropriately sized, the back-folded portion can be easily peeled off, and the second barcode can be exposed to the front side of the label and read by the barcode reader by removing the back-folded portion. After reading, it can be folded back and reattached to the back side of the first label part. Alternatively, the second label part to which the second barcode is printed can be separated from the first label part.

If the second label part including the second barcode is positioned at a lengthwise end of the label sheet, the second barcode part can be easily folded to the back side of the label.

The tear-off portion can alternatively be formed across both the second liner sheet portion and the first liner sheet portion.

In this configuration, the tear-off portion is defined by a score line that goes from one widthwise edge of the first liner sheet portion through the second liner sheet portion to the other widthwise edge of the first liner sheet portion. In this aspect of the invention the tear-off portion is contiguous to the first liner sheet portion on the first label part side. Therefore, if the tear-off portion is pulled in the tear-off direction after removing the tear-off portion and forming the back-folded portion, the first liner sheet portion contiguous thereto can be easily peeled from the back of the first label part.

In another aspect of the invention the tear-off portion is defined by two score lines that extend from one widthwise edge to the other edge in the liner sheet. Because the first liner sheet portion and second liner sheet portion will be completed separated from each other if the tear-off portion is removed, there is no need to cut the first liner sheet portion from the second liner sheet portion, and peeling off the first liner sheet portion is simple.

The tear-off portions can also be formed in plural locations. By increasing or decreasing the number of tear-off portions, the adhesive strength of the back-folded portion can be adjusted.

The barcode label of the invention can also be used as an airline luggage tag or as a shipping label for overland shipping. In such configurations tracking information may be printed in the first label part, and a barcode containing corporate or product advertising information, or additional service information, may be printed in the second label part.

EFFECT OF THE INVENTION

The barcode label of the invention can be affixed to a target object so that only the first barcode can be read from the front and the second barcode is hidden on the back side of the label. The second barcode hidden on the back side can also be unfolded as needed and exposed to the front for reading. Therefore, when a barcode label according to the invention having an added second barcode is used in place of a label that is used in a management system that uses a first barcode, first barcode reading problems caused by the second barcode being read with the first barcode will not occur. The invention can therefore be used with existing management systems that use barcodes without modifying the existing management system, and additional services that are based on a newly added second barcode can be provided. Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 1A-1C are plan views of the front and the back, and a section view, of a barcode label according to the invention.

FIGS. 2A-2F describe a method of using the barcode label shown in FIG. 1.

FIGS. 3A-3B are plan views and describes using a barcode label according to another embodiment of the invention.

DESCRIPTION OF EMBODIMENTS

Figure 4A:
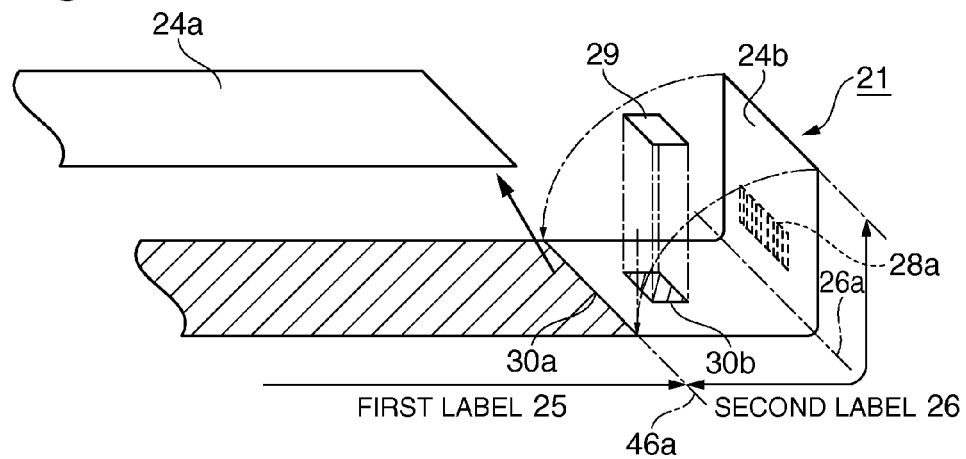
FIGS. 4A-4C shows three examples of barcode labels according to the invention.

A preferred embodiment of a barcode label according to the invention is described below with reference to the accompanying figures.

Configuration of a Shipping Label

FIGS. 1A-1C shows an example of the invention used to produce barcode labels as shipping labels such as used in the package delivery industry, FIG. 1A being a plan view of the front, FIG. 1B being an enlarged section view through the thickness of the label, and FIG. 1C being a plan view of the back side of the label. As shown in the figures, the shipping label 1 is rectangular with a constant width and constant length, and has a label sheet 2 on the front side. Information can be printed in color by an inkjet printer, for example, on the surface 2a of the label sheet 2. An adhesive layer 3 is formed on the back 2b of the label sheet 2, and is covered by a liner sheet 4. The liner sheet 4 can be peeled off. The liner sheet 4 is slightly wider and longer than the label sheet 2.

The label sheet 2 is divided lengthwise into two parts with a regular shipping label 5 occupying one part and an added advertising label 6 occupying the other part. Tracking information 7 (first printed information) is printed on the front of the shipping label 5. The tracking information 7 includes the destination address, a tracking number, and other such information that is also encoded and printed in barcode form. In this example first barcodes 7a and 7b each carrying the tracking information are printed.

Product advertising information 8 (second printed information) is printed on the front of the advertising label 6. This product advertising information includes a second barcode 8a that contains additional service information, for example, and the second barcode 8a is also printed on the front of the advertising label 6. In this example the second barcode 8a is printed widthwise at the lengthwise end of the label sheet 2. A plurality of second barcodes may obviously be printed.

In the following description, the part of the liner sheet 4 that covers the back of the shipping label 5 is referred to below as the first liner sheet part 4a, and the part covering the back of the advertising label 6 is referred to as the second liner sheet part 4b. A tear-off tab 9 enabling peeling at least part of the liner sheet 4 from the label sheet 2 is formed in at least one of the first liner sheet part 4a and second liner sheet part 4b. In this embodiment of the invention the tear-off tab 9 is defined by a score line 10 formed in the liner sheet 4. The score line 10 extends from one widthwise edge 4c to the other edge 4d of the liner sheet 4 at the second liner sheet part 4b side end of the first liner sheet part 4a, and the liner sheet 4 is separated into two parts along the score line 10. The score line 10 goes to a narrowed peak on the second liner sheet part 4b side in the widthwise middle part of the liner sheet 4 such as shown in the figure.

The tear-off tab 9 defined by the score line 10 is therefore the peak-shaped portion of the first liner sheet part 4a that extends into the second liner sheet part 4b side. The tear-off tab 9 may be formed at any position satisfying the following conditions. That is, the tear-off tab 9 can be formed at any position where, when the part where at least the second barcode 8a is printed on the advertising label 6 is folded over to the back side of the advertising label 6, the tear-off tab 9 is positioned at the back side of at least one of the following: the back side of the folded portion, the back side of the advertising label 6 that is opposite this folded portion, and the back side of the shipping label 5 that is opposite this folded portion.

If the tear-off tab 9 thus shaped is peeled off from the peak 9a, the liner sheet portion 4A on the shipping label side of the score line 10 (that is, the tear-off tab 9 and the first liner sheet part 4a contiguous thereto) can be separated from the label sheet 2. After these parts are peeled off, the liner sheet remainder 4B on the advertising label side of the score line 10 is left.

Using the Shipping Label

FIGS. 2A-2B describe how the foregoing shipping label 1 is used. Before the shipping label 1 is affixed to the product P to be shipped, the second barcode 8a is folded over to the back side of the label so that it cannot be seen from the front.

First, as shown in FIG. 2A and FIG. 2B, only a specific length of the tear-off tab 9 on the back of the shipping label 1 is peeled back from the peak 9a along the score line 10. This creates an exposed adhesive layer portion 3a where the adhesive layer 3 is exposed on the back side of the label sheet 2 from which the tear-off tab 9 was removed.

The advertising label 6 is then folded to the back side along a folding line 6a that extends widthwise at a specific position.

This folding line 6a is set to a position where the entire second barcode 8a can be completely folded to the back side. The entire advertising label 6 could be folded back, but so that the advertising information printed in addition to the second barcode 8a can always be seen, the folding line 6a is preferably positioned so that the second barcode 8a alone can be folded to the back. By folding the advertising label 6 to the back at the folding line 6a, a back-folded portion 1B is formed as shown in FIG. 2C.

Note that the folding line 6a can be positioned as desired, and a folding line 6a indicating the folding position may be printed on the label sheet. An easy-to-fold part is also preferably formed along the folding position (folding line 6a) so that the advertising label 6 is easy to fold. For example, a perforation may be formed in either or both of the label sheet and the liner sheet. The label itself could also be cut along the folding position (folding line 6a). Even if the label is cut along this line, the liner sheet remains connected and the label will separate from the liner. Because the liner sheet 4 is typically easier to bend than the advertising label 6, the label can be cleanly and easily folded along the easy-to-fold part defined by the cut.

The exposed adhesive layer portion 3a is formed on the back side of the label facing the back-folded portion 1B thus formed. The exposed adhesive layer portion 3a also extends to the back of the back-folded portion 1B. Therefore, as shown in FIG. 2D, the back-folded portion 1B is held affixed to the back side of the label by the exposed adhesive layer portion 3a, and the second barcode 8a formed on the front of the back-folded portion 1B is hidden on the back side of the label.

As shown in FIG. 2D, by pulling the tear-off tab 9 in the direction away from the back side of the label sheet 2, the liner sheet portion 4A contiguous thereto can be peeled off. After the liner sheet portion 4A is peeled off, the shipping label 1 is attached to a specific position on the surface Pa of the product P to be shipped. When the shipping label 1 is thus affixed, only the first barcodes 7a and 7b containing the tracking information can be read by a barcode reader from the front of the label, and the second barcode 8a is hidden facing the back and cannot be read.

Therefore, during the shipping process the shipping label 1 can be read using a barcode in the same way as any other shipping label, and the tracking information contained in the first barcodes 7a and 7b can be read and used for shipping control.

However, when the second barcode 8a printed on the advertising label 6 needs to be read, the back-folded portion 1B can be raised from the surface Pa of the product P, and as shown in FIG. 2F the back-folded portion 1B can be unfolded to the front and returned to its original position. The back-folded portion 1B can be easily lifted up because it is not fastened to the surface Pa of the product P. In addition, the back-folded portion 1B is only partially held by the exposed adhesive layer portion 3a to the back side, and the adhesive layer 3 on other parts of the back-folded portion 1B are covered by the liner sheet remainder 4b. As a result, the back-folded portion 1B can be easily unfolded and returned to the original position.

Because the second barcode 8a is again exposed to the front after being unfolded to the front, it can be read using the barcode reader. If the second barcode 8a only needs to be read once, the second barcode 8a can be easily torn off and read by the barcode reader by, for example, forming a perforation between the advertising label 6 and shipping label 5. The advertising label 6 could, of course, be previously separated from the shipping label 5. If the second barcode 8a must be read multiple times, the second barcode 8a may be again folded to the back to form the back-folded portion 1B again.

Use as a Luggage Tag

FIGS. 3A-3B describe using the barcode label according to the invention as a luggage tag for luggage checked onto an airplane. FIG. 3A is a plan view of the barcode label and FIG. 3B shows how the barcode label is used. The basic configuration of the luggage tag 11 is the same as the shipping label 1 described above, and is a long, thin label of a constant width with a label sheet 12 on the front side and a liner sheet 14 that covers an adhesive layer formed on the back of the label sheet 12.

A shipping label 15 on which tracking information 17 is printed, and an advertising label 16 on which advertising information 18 is printed are formed on both sides of the label sheet 12 rotationally symmetrical to the lengthwise center. First and second barcodes 17a and 17b containing the tracking information (such as destination and flight number) are printed on the shipping label 15. The advertising label 16 may be a delivery service ticket that is used when shipping luggage from the airport by means of a package delivery service, for example, and a second barcode 18a is printed on the advertising label 16.

A tear-off tab 19 similar to that described in FIG. 1 and FIG. 2 is formed at both lengthwise ends of the liner sheet 14 of the luggage tag 11. As shown in FIG. 3B, a back-folded portion 11B is formed on both ends of the label by folding the entire advertising label 16, which can be used as a coupon, to the back side along a folding line 16a at the border to the shipping label 15. The liner sheet portions 14A of the liner sheet 14 on the back side of the shipping label can thus be removed, and the luggage tag 11 can be passed through the handle Pb of the package P1, folded at the lengthwise center, and the opposite ends of the luggage tag 11 can be stuck together. As a result, the first and second barcodes 17a and 17b used for luggage control can be read by a barcode reader, and the second barcode 18a is hidden on the back side so that it will not be read. As a result, the second barcode 18a will not be accidentally read when reading the tracking information, thus avoiding creating problems with shipping (routing) control due to misread labels and other read errors.

Other Embodiments

In the embodiments described above the tear-off tab 9 formed in the liner sheet is contiguous to the liner sheet portion 4A, 14A on the back side of the shipping label. A configuration in which only the tear-off tab 9 can be peeled from the back of the label is also conceivable, however.

Figure 4B:
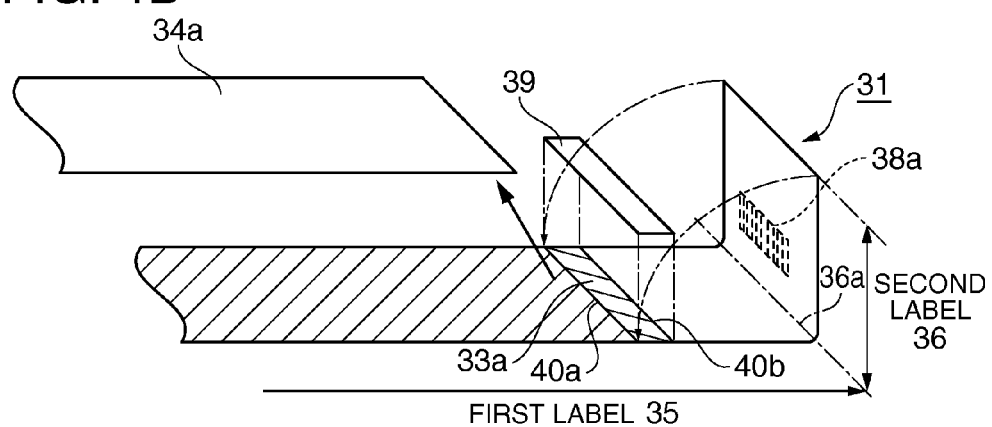
Figure 4C:
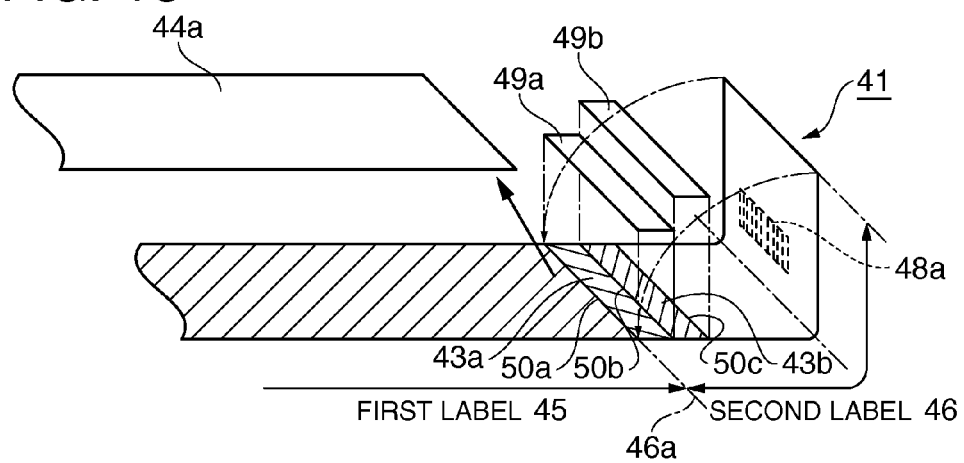

FIGS. 4A-4C show an example of a barcode label with this type of tear-off tab. As shown in FIG. 4A, the barcode label 21 has a score line 30a formed extending widthwise to the liner sheet between a first label 25 and a second label 26, separating the liner sheet part 24a on the first label side and the liner sheet part 24b on the second label side. In addition, near the score line 30a side of the liner sheet part 24b, a rectangular tear-off portion 29 is defined by a score line formed in a specific closed shape, such as a rectangular score line 30b.

A second barcode 28a is printed on the label end side of the second label 26, and is folded to the back side along the folding line 26a so that the second barcode 28a will be hidden on the back side. The back-folded portion formed by folding to the back side is affixed to the back of the label by the exposed adhesive layer portion 23a that is rendered by removing the tear-off portion 29. The liner sheet part 24a on the first label side is then removed and the barcode label 21 is affixed to the surface of the intended object.

The barcode label 31 shown in FIG. 4B has a tear-off portion 39 formed by two parallel score lines 40a and 40b that extend widthwise to the label with a specific gap therebetween formed near the second label 36 end of the first label 35.

A second barcode 38*a* is printed on the label end side of the second label 36, and is folded to the back side along the folding line 36*a* at the border between the first and second labels so that the second barcode 38*a* will be hidden on the back side. The back-folded portion formed by folding to the back side is affixed to the back of the label by the exposed adhesive layer portion 33*a* that is rendered by removing the tear-off portion 39. The liner sheet part 34*a* on the first label side is then removed and the barcode label 31 is affixed to the surface of the intended object.

The barcode label 41 shown in FIG. 4C has two tear-off portions 49*a* and 49*b* formed by three parallel score lines 50*a*, 50*b*, and 50*c* that extend widthwise to the label with a specific gap therebetween formed near the first label 45 end of the second label 46.

A second barcode 48*a* is printed on the label end side of the second label 46, for example, and is folded to the back side along the folding line 46*a* at the border between the first and second labels so that the second barcode 48*a* will be hidden on the back side. The back-folded portion formed by folding to the back side is affixed to the back of the label by the exposed adhesive layer portions 43*a* and 43*b* that are rendered by removing the tear-off portions 49*a* and 49*b*. The liner sheet part 44*a* on the first label side is then removed and the barcode label 41 is affixed to the surface of the intended object. This configuration has the benefit of being able to change the adhesive strength of the back-folded portion by selectively removing only one of the tear-off portions 49*a* and 49*b* or by removing both.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A barcode label comprising:
   a label sheet of a specific length, including a first label part on which first printed information including a first barcode is printed, and a second label part on which second printed information including a second barcode is printed, the second barcode containing different information than the first barcode;
   an adhesive layer formed on the back side of the label sheet; and
   a liner sheet that removably covers the adhesive layer, and includes
      a first liner sheet portion positioned on the back side of the first label part,
      a second liner sheet portion positioned on the back side of the second label part, and
      a tear-off portion that enables completely removing only a part of the liner sheet from the remainder of the liner sheet and the label sheet, is formed in at least one of the first liner sheet portion and second liner sheet portion, and
      when at least the portion of the second label part where the second barcode is printed is folded to the back side of the second label part and forms a back-folded portion, the tear-off portion is positioned adjacent to at least one of the back side of the back-folded portion, the back side of the second label part facing the back-folded portion, and the back of the first label part facing the back-folded portion.

2. The barcode label described in claim 1, further comprising:
   an easy-to-fold part that defines a folding position for forming the back-folded portion, and is a perforation formed in at least one of the label sheet and liner sheet, or is a scored line formed by cutting the label sheet.

3. The barcode label described in claim 1, wherein:
   the second label part including the second barcode is positioned at a lengthwise end of the label sheet.

4. The barcode label described in claim 1, wherein:
   the tear-off portion is formed across both the second liner sheet portion and the first liner sheet portion.

5. The barcode label described in claim 1, wherein:
   the tear-off portion is defined by a score line that goes from one widthwise edge of the first liner sheet portion through the second liner sheet portion to the other widthwise edge of the first liner sheet portion.

6. The barcode label described in claim 1, wherein:
   the tear-off portion is defined by two score lines that extend from one widthwise edge to the other edge in the liner sheet.

7. The barcode label described in claim 1, wherein:
   tear-off portions are formed in plural locations such that the amount of the adhesive layer that contacts the back-folded portion can be varied thereby changing the adhesive strength of the back-folded portion.

8. The barcode label described in claim 1, wherein:
   at least one of corporate advertising information and product advertising information is included in the second printed information and the second barcode printed on the second label part.

9. The barcode label described in claim 8, wherein:
   the first printed information printed in the first label part includes destination, passenger name, and flight name information, and is used as an airline luggage tag.

10. The barcode label described in claim 8, wherein:
    the first printed information printed in the first label part includes destination and package content information, and is used as a shipping label for overland shipping.

11. The barcode label described in claim 1, wherein:
    the tear-off portion is defined by a score line formed in a specific closed shape.

12. The barcode label described in claim 1, wherein:
    the second barcode contains information other than tracking information.

13. The barcode label described in claim 1, wherein:
    when the tear-off portion is removed, a portion of the adhesive layer is exposed and a portion of the second liner sheet remains affixed to the label sheet such that when the second label part where the second barcode is printed is folded to the back side of the second label part, the portion of the adhesive layer that is exposed contacts a first part of the back-folded portion and the remainder of the back-folded portion is covered by the liner sheet.

14. The barcode label described in claim 1, wherein the adhesive layer covers the entire surface of the backside of the label sheet.

15. The barcode label described in claim 1, wherein the liner sheet covers the entire surface of the backside of the label sheet.

16. A method of using a barcode label comprising:
    obtaining a bar code label, the bar code label comprising
       a label sheet of a specific length, including a first label part on which first printed information including a first barcode is printed, and a second label part on which second printed information including a second barcode is printed, the second barcode containing different information than the first barcode;
an adhesive layer formed on the back side of the label sheet; and
a liner sheet that removably covers the adhesive layer, and includes
 a first liner sheet portion positioned on the back side of the first label part,
 a second liner sheet portion positioned on the back side of the second label part, and
 a tear-off portion that enables completely removing only a part of the liner sheet from the remainder of the liner sheet and the label sheet, is formed in at least one of the first liner sheet portion and second liner sheet portion, and
 when at least the portion of the second label part where the second barcode is printed is folded to the back side of the second label part and forms a back-folded portion, the tear-off portion is positioned adjacent to at least one of the back side of the back-folded portion, the back side of the second label part facing the back-folded portion, and the back of the first label part facing the back-folded portion;
removing the tear-off portion and forming an exposed adhesive layer portion;
folding the second label part to the back at a specific position to form a back-folded portion that is affixed to the back side of the barcode label by the exposed adhesive layer portion so that the second barcode is hidden on the back side of the barcode label; and
after forming the back-folded portion, removing the first liner sheet portion from the first label part and affixing the first label part on an intended object so that the first barcode printed in the first label part can be read by a barcode reader.

17. The method of using a barcode label described in claim 16, further comprising removing and unfolding the back-folded portion from the back side of the barcode label to the front of the barcode label to expose the second barcode or tear off the unfolded back-folded portion in order to read the second barcode on the second label part.

* * * * *